April 2, 1968  A. D. LAWSON  3,376,570
CONTROL APPARATUS

Filed Sept. 17, 1964

INVENTOR.
ARNOLD D. LAWSON
BY
*S.C.Yeaton*
ATTORNEY

April 2, 1968   A. D. LAWSON   3,376,570
CONTROL APPARATUS
Filed Sept. 17, 1964   6 Sheets-Sheet 2

INVENTOR.
ARNOLD D. LAWSON
BY
ATTORNEY

April 2, 1968  A. D. LAWSON  3,376,570
CONTROL APPARATUS

Filed Sept. 17, 1964                6 Sheets-Sheet 3

INVENTOR.
ARNOLD D. LAWSON
BY
ATTORNEY

April 2, 1968        A. D. LAWSON        3,376,570

CONTROL APPARATUS

Filed Sept. 17, 1964        6 Sheets-Sheet 4

INVENTOR.
ARNOLD D. LAWSON
BY
ATTORNEY

April 2, 1968

A. D. LAWSON 3,376,570

CONTROL APPARATUS

Filed Sept. 17, 1964

INVENTOR.
ARNOLD D. LAWSON
BY
ATTORNEY

FIG.6b.

United States Patent Office 3,376,570
Patented Apr. 2, 1968

3,376,570
CONTROL APPARATUS
Arnold D. Lawson, Phoenix, Ariz., assignor to Sperry Rand Corporation, Great Neck, N.Y., a corporation of Delaware
Filed Sept. 17, 1964, Ser. No. 397,114
21 Claims. (Cl. 340—347)

ABSTRACT OF THE DISCLOSURE

An analog signal representing a changing angle is applied to an analog-to-pulse converter. The resulting pulses are counted in a pair of counters so that one counter counts up as the other counts down. A phasing circuit reverses the mode of operation of each counter when the stored count represents an angle passing between quadrants. The outputs of the counters are applied to digital-to-analog converters and combined with reference signals. The combined signal may be used directly or fed back into the input of the device.

---

The present invention relates in general to resolvers, and in particular it provides apparatus for resolving an angle representative quantity into sine and cosine components without need for devices which utilize relatively movable parts. In this sense then, the invention provides a function similar to that of the apparatus to U.S. Patent 2,995,302, isued in the name of D. R. Ingwerson et al. and assigned to the instant assignee, and as sketchily shown in Computer Handbook, Huskey and Korn, McGraw-Hill Book Company, 1962, Library of Congress catalogue No. 60-15286, pages 3-56 through 3-61.

The premise on which the present invention operates is as follows: For an angular change which is positive, an instantaneously positive cosine quantity means that the sine must increase proportionately with such angular change. Conversely, were the cosine to be negative during a positive angle change, the sine then would have to decrease in value. Extending the premise for negative angular changes means that when the cosine is positive the sine then will have to decrease, and when the cosine is negative during such negative angular changes, the sine will then proportionately increase. In other words, the invention proposes that the signs of two distinct quantities, viz. the sense of an angular change and the sense (sign) of the cosine, be examined to determine how a third (the sine) should change.

The above premise applies equally as well in determining how the cosine should change in value. That is, a positive angular change with a positive sine means the cosine should decrease; a negative angular change with a positive sine means the cosine should increase. Conversely, a positive angular change with a negative sine, the cosine should increase; and a negative angular change with a negative sine means the cosine should decrease.

The above will best be appreciated with reference to FIGS. 1a and 1b which are diagrams useful in describing the invention.

A principal object of the invention is to provide an improved form of resolver apparatus.

Another object of the invention is to provide a resolver employing a logic circuit responsive to the direction of change of an input signal and the sign of a signal provided by a complementing resolving component.

Another object of the invention is to provide a digital resolver employing complementing counters and a logic circuit for determining the directions that said counters count, said logic circuit being responsive both to the direction that an applied signal changes and to the sign of the count of one counter to determine whether the other counter should count up or down.

Another object of the invention is to provide an integrating circuit that digitally resolves a signal into complementing signal components while providing analog forms of those signal components.

Another object of the invention is to provide a digital integrator capable of being synchronized to a reference system, said integrator resolving a signal into complementing signal components which are analog in nature.

Figure 1A:
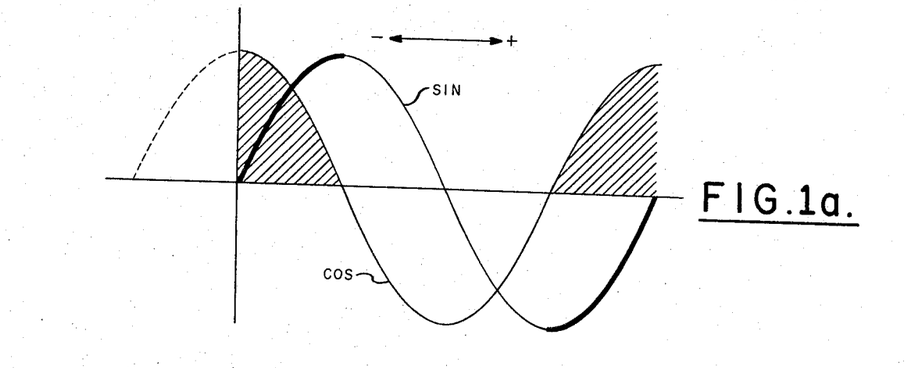
Figure 1B:
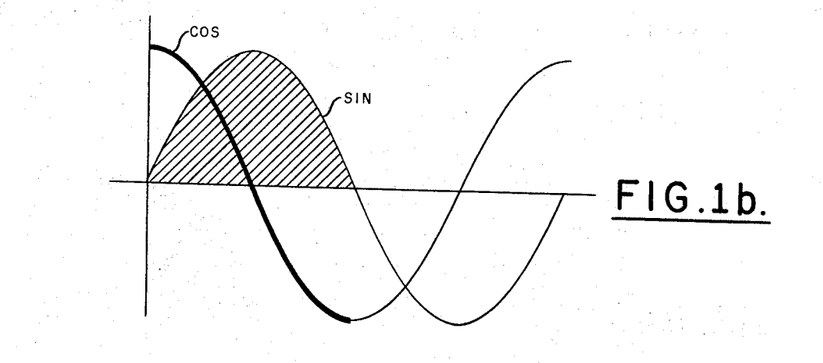

Referring to FIGS. 1a and 1b, four quadrants of sine and cosine waveforms are shown for substantiating the aforementioned premise. In moving along the FIG. 1a abscissa toward the right (positive phase or change in angle) while the cosine is positive, the sine will increase in magnitude, i.e., either from zero to a positive maximum or from a negative maximum to zero. Going the opposite way along the abscissa (negative phase or change in angle) while the cosine is positive causes the sine to decrease either from zero to a negative maximum or from a positive maximum to zero. When the cosine is negative a positive phase or change in angle causes the sine to decrease from a positive maximum to a negative maximum, whereas a negative phase or angle change here causes the sine to increase from a negative maximum to a positive maximum. FIG. 1b shows that a positive angle change when the sine is positive causes the cosine to decrease from a positive maximum to a negative maximum, and a negative phase or change in angle when the sine is positive causes the cosine to increase from a negative maximum to a positive maximum. A negative sine with a positive phase or angle change means a cosine increase from negative to positive maximums; and a negative phase or angle change while the sine is negative means a cosine decrease from positive to negative maximums.

Figure 2:
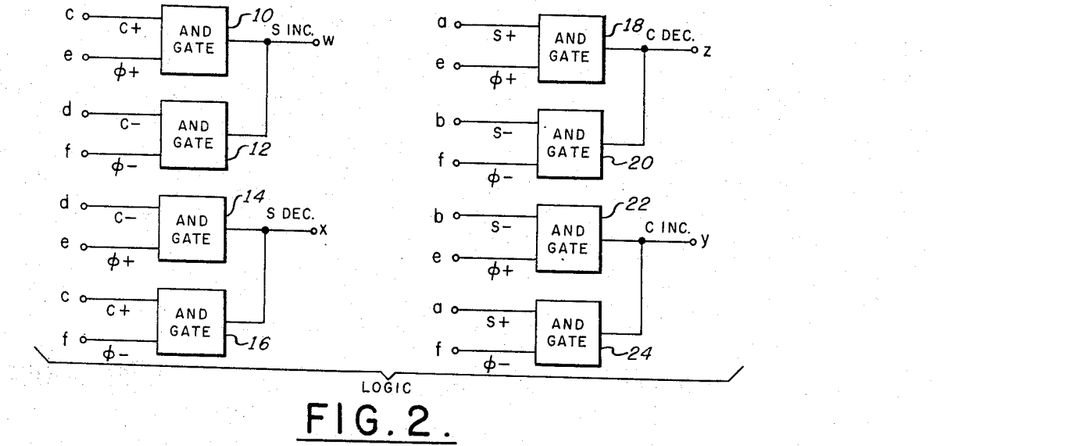
FIG. 2 is a functional block diagram showing how the above stated premise may be implemented.

FIG. 2 shows eight AND function blocks for implementing the above-mentioned premise and for providing pairs of output signals for either increasing or decreasing the sine quantity, and for either increasing or decreasing the cosine quantity. Typically the circuit of FIG. 2 works as follows: When both the cosine and phase or angle change are positive, a gate 10 applies an output signal to a terminal W; a negative cosine and phase cause a gate 12 to apply an output signal to the terminal W. In like manner, gates 14 and 16 apply signals to a terminal X for respectively negative cosine-positive phase and positive cosine-negative phase conditions; gates 18 and 20 apply signals to a terminal Z for respectively positive sine-positive phase and negative sine-negative phase conditions; and gates 22 and 24 apply signals to a terminal Y for respectively negative sine-positive phase and positive sine-negative phase conditions.

Figure 3:
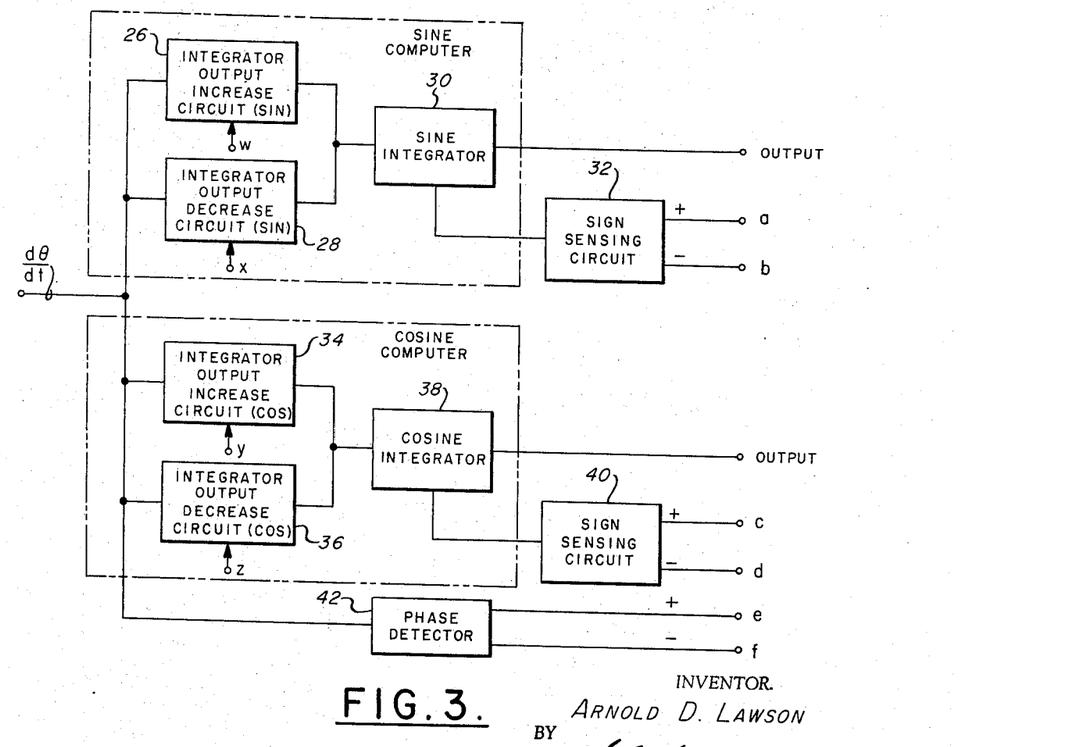
FIG. 3 is a block diagram showing broadly an embodiment of the invention.

FIG. 2 terminals *a* through *f* are to be connected to correspondingly designated terminals on FIG. 3, from whence signals are provided for operation of the FIG. 2 circuit. In feedback fashion then the FIG. 2 terminals W through Z are connected to correspondingly designated terminals on the apparatus of FIG. 3, whereby sine and cosine computers may be properly operated.

FIG. 3 shows a sine computer having sine increase and decrease circuits 26 and 28 which receive simultaneously a signal representing some angular change $d\theta/dt$ and, depending respectively on whether a signal is applied to terminals W or X, a sine signal provided by an integrator 30 is increased or decreased when $\theta$ changes. A circuit 32 connects to the integrator 30 and senses whether the signal held by the integrator is positive or negative.

A cosine computer identical to the sine computer has cosine increase and decrease circuits 34 and 36 respectively, an integrator 38, and a circuit 40 for sensing the polarity of the integrator 38 signal. A phase detector 42, one form of which is shown later with respect to FIG. 4a, senses whether $\theta$ is changing in an increasing or decreasing direction.

As to operation of the apparatus of FIG. 3, assume that $d\theta/dt$ and sine $\theta$ initially are zero, and that cosine $\theta$ is at some positive maximum. Increase $\theta$, say up to 90°, causes a signal to appear on contact $e$, which together with the signal at terminal $c$, causes the logic gate 10 to apply a signal to its output terminal W, whereby the circuit 26 so produces an output signal that the sine integrator 30 accumulates each incremental change in the signal $\theta$. Simultaneously, the signal at terminal $e$ of the phase detector 42 and the signal appearing on terminal $a$ of the sensing circuit 32 cause the logic AND gate 18 to apply a signal to its output terminal Z, which signal so causes the circuit 36 to produce an output signal that each incremental change in the signal $\theta$ proportionately detracts from the signal held by the cosine integrator 38. Running $\theta$ from 90° back down to zero causes the sign of only the phase signal to change, whereby a signal appears on terminal $f$ of the detector 42. The signal on terminal $f$ and the signals on terminals $a$ and $c$ cause the logic gates 16 and 24 to apply output signals to terminals X and Y respectively, whereby the circuits 28 and 34 cause the signals held by the integrators 30 and 38 to decrease and increase respectively. How the circuit of FIG. 3 operates to compute sine and cosine functions for angles greater than 90° will be shown later with respect to the individual species.

Figure 4A:
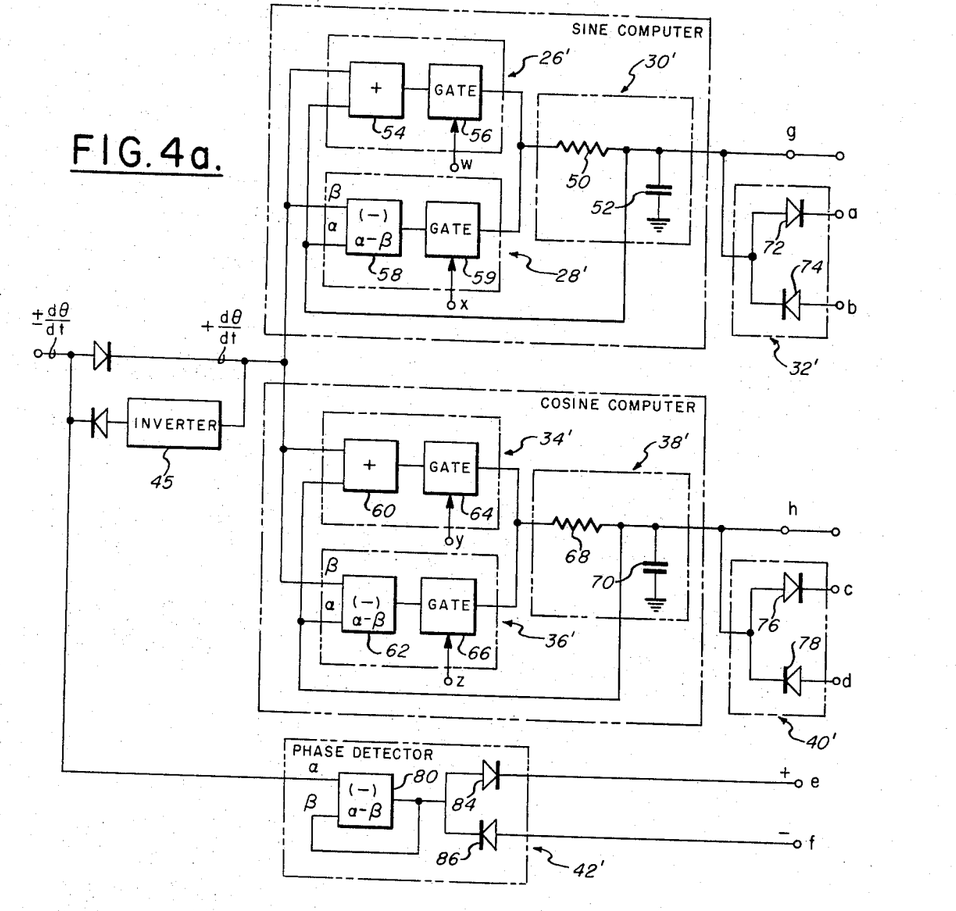
FIGS. 4a and 4b are diagrams showing a species of the invention.

Referring to FIG. 4a, an analog version of the apparatus of FIG. 3 has correspondingly designated elements indicated by means of primes, such version also having a network 45 for assuring (regardless of the sense of the applied signal) that only positive signals get applied to its sine and cosine computers. The sine function integrator in this form of the invention is shown as an RC integrator 30' comprising a resistor 50 and a capacitor 52. The integrator output increase circuit 26' comprises a summing element 54 arranged to receive the input signal $d\theta/dt$ and (in feedback manner) the signal held by the integrator 30', and a gate circuit 56 which is made conductive by a signal appearing on its contact W; the integrator output decrease circuit 28' here comprises a difference element 58 arranged to receive the signal $d\theta/dt$ and the signal held by the integrator 30', and a gate circuit 59.

The cosine computer of FIG. 4a is identical to the sine computer thereof having summing and difference elements 60 and 62 with cooperating gate circuits 64 and 66 respectively for the integrator output increase and decrease circuits. The integrator 38' is again an RC circuit consisting of a resistor 68 and a capacitor 70. The sense of the signal held by the integrator 30 is determined by a pair of cooperating oppositely oriented diodes 72 and 74. So too the sense of the signal held by the integrator 38' is determined by a pair of diodes 76 and 78. Signals appearing at the output terminals $a$ through $d$ of the diodes 72, 74, 76 and 78 are applied to respective input terminals of the logic circuit of FIG. 2, and means (one form of which is shown later with respect to FIG. 4b) is provided for establishing initial conditions for the FIG. 4a embodiment, i.e., initially the capacitor 70 must be charged to some positive maximum while the capacitor 52 is discharged.

The phase detector 42' for detecting the direction in which $\theta$ changes has a difference element 80 arranged to receive the signal $d\theta/dt$ and its own output signal, which latter signal is slightly delayed as it passes through the circuit 80. The sense of the difference signal output from the circuit 80 is determined by a pair of oppositely oriented diodes 84 and 86.

Assuming for the moment that the capacitor 70 is fully charged positively with respect to ground and the capacitor 52 is fully discharged, a positive change in $\theta$ causes the capacitor 52 to charge in response to a positive signal appearing at the output of the summing element 54, a gate opening signal being applied to the gate 56 via contact W from the logic element 10 of FIG. 2, i.e., a positive cosine signal on capacitor 70 is applied through the diode 76 and a positive phase signal is applied through the diode 84 to the gate 10. Simultaneously with this happening the positive signal $d\theta/dt$ is subtracted from the positive cosine signal stored by the capacitor 70, and such positive resultant difference signal is gated through the gate 66 by a signal appearing on contact Z of FIG. 2 element 18 (positive sine and positive phase) to be stored by the capacitor 70. In other words, as the signal on the capacitor 52 increases in sinusoidal fashion, the signal on the capacitor 70 decreases in cosinusoidal fashion.

To see further how the apparatus of FIG. 4a works, assume again the same initial condition, but assume that $\theta$ is changed not in a positive direction but in a negative direction (toward the fourth quadrant). Now a negative going signal appears at the output of the difference circuit 58 and is gated through the gate 59 by a signal on contact X (negative phase and positive cosine) whereby the capacitor 52 charges negatively with respect to ground. With a negative sine signal being sensed by the diode 74, the logic element 20 of FIG. 2 applies a signal to contact Z causing the gate 66 to open. Therefore, the positive signal held by the capacitor 70 decreases to equal the output of the difference circuit 62.

With the sine computer capacitor 52 charged positively to a maximum ($\theta=90°$) and the capacitor 70 without a charge, a positive change in $\theta$ to an angle greater than 90° will cause a signal to be applied from logic element 18 to contact Z whereby the gate 66 will open to allow a negative signal to charge the capacitor 70. Such negative signal in turn, together with the positive phase or anglechange signal will cause the logic element 14 to apply a signal to contact X, causing the difference circuit 58 to decrease the signal held by the capacitor 52.

Figure 4B:
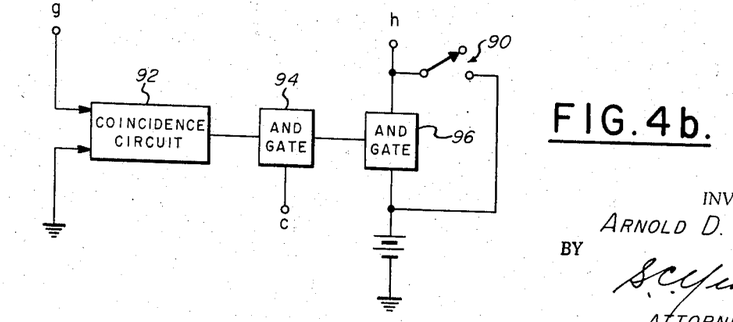

To set initial conditions for the circuit of FIG. 4a, and also to keep such circuit operating properly, the circuit of FIG. 4b is provided. A switch 90 for applying a maximum voltage to the capacitor 70 of the cosine computer when neither the capacitor 52 nor the capacitor 70 holds a charge causes the capacitor 70 to charge, after which time the switch 90 is opened. From that point on, the remainder of the circuit of FIG. 4b operates to keep the capacitors 52 and 70 properly charged. A coincidence circuit 92, for example the circuit shown and described in Massachusetts Institute of Technology Radiation Laboratories Series, volume 19, page 343, FIGS. 9–20, McGraw-Hill Publishing Company, Inc., 1949, has its two input terminals connected respectively to FIG. 4a contact $g$ and to ground, whereby when the capacitor 52 holds no charge a signal gets applied to an AND gate 94 arranged to receive also a positive signal from the capacitor 70. With such signals simultaneously applied to the AND gate (i.e., when $\theta=0°$, 360°, etc.) a signal is applied to an AND circuit 96 whereby the circuit 96 becomes conductive to apply the aforesaid maximum voltage to the capacitor 70 to restore whatever charge has leaked off.

Figure 5A:
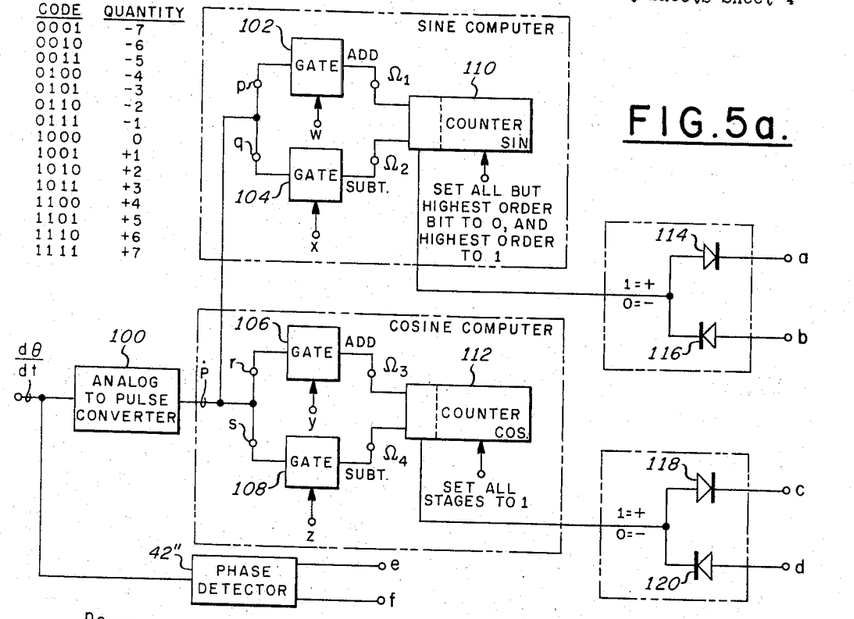
FIGS. 5a, 5b and 5c together show another species of the invention.
Figure 5B:
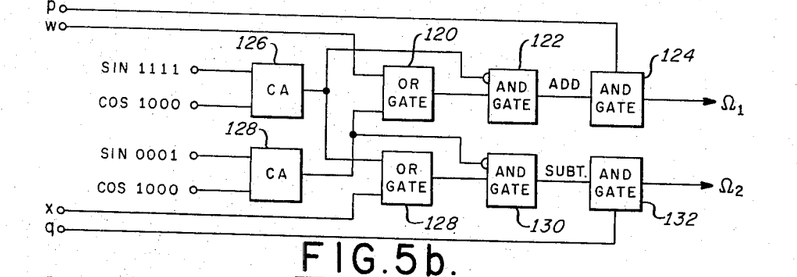
Figure 5C:
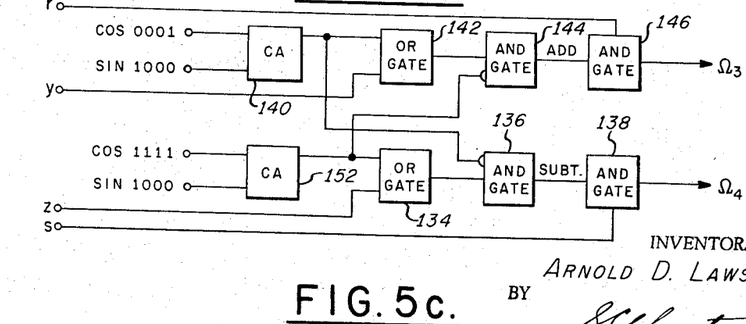

FIGS. 5a, 5b and 5c show how a digital version of the apparatus of FIG. 3 may be provided. The signal $d\theta/dt$ is converted in element 100 to a train of pulses P, the pulse occurrence rate of which is proportional to the rate at which θ changes. For a circuit useful in changing an analog signal dθ/dt to a variable pulse rate train reference should be had, for example, to the circuit of FIG. 14.22 on page 14–26 of Handbook of Semiconductor Electronics, Lloyd P. Hunter, McGraw-Hill Book Company, Library of Congress, catalog No. 61-7843.

The pulse train P is applied to two pairs of circuits 102, 104 and 106, 108, which circuits perform gating functions, being more elaborately shown in FIGS. 5b and 5c. How these gating function circuits operate is described later in conjunction with the description relating to the operation of the overall apparatus presently described; suffice it here to say though that the circuits 102, 104, 106 and 108 operate to permit pulses selectively to pass through them to reversible counters 110 and 112. Both counters serve as integrators and may be like the circuit which forms the basis of U.S. Patent 2,656,460, i.e., they are arranged to receive pulses which pass through circuits 102 and 106 to count upward, whereas when pulses pass through the circuits 104 and 108 they count down, such counters being provided with means for setting (for θ=0) their respective stages as indicated on FIG. 5a. Depending on whether the highest order bit is a ONE or ZERO the counters apply respectively through diode pairs 114, 116 and 118, 120 signals indicating the sign of the respective count held by the counters. A phase detector 42″ like that shown in FIG. 4a receives the signal dθ/dt and determines in which direction θ is changing.

Referring now to the circuits of FIGS. 2, 5a, 5b and 5c, and to the "four bit binary-decimal" relationship shown by way of a legend to FIG. 5a, and with both counters 110 and 112 set with initial counts of 1000 and 1111 respectively, a positive change in θ together with the ONE appearing at contact c causes the AND gate 10 to apply a signal to contact W. This signal passes through an OR gate 120 and then through an AND gate 122 to an AND gate 124. Hence, the gate 124 becomes conductive to permit the pulse train appearing on contact p to pass through it to cause the counter 110 to count up.

As the counter 110 counts up from 1000 to 1001 to 1010 etc., the ONE and dθ/dt signals at contacts a and e respectively cause the counter 112 to count down. With θ still changing positively, at the instant the sine counter 110 reaches a maximum of 1111, the cosine reaches 1000, i.e., a poistive sine and angle change cause the gate 118 to apply a signal through an OR gate 134 and an AND gate 136 to an AND gate 138 to make the counter 112 count down to cosine θ=0. Therefore, the next pulse should cause the sine counter to start counting down, i.e., to 1110, which it does (in spite of the fact that at the moment of occurrence of such next pulse the cosine sign bit is a ONE) because a digital coincidence circuit 126, e.g., the EXCLUSIVE OR circuit on page 15–18 of Handbook of Automation, Computation and Control, John Wiley and Sons, Inc., Library of Congress, catalog card No. 58-10800, inhibits the AND gate 122 while applying a signal through the OR gate 128 which passes through the AND gate 130. Hence the pulse train now passes via a contact q through a gate 132 to cause the counter 110 to count down. While this happens the cosine counter 112 continues to count down through zero and into the area of negative numbers because both the sign of the sine and the sign of the signal dθ/dt remain unchanged, wherefore the AND gate 14 applies a signal via contact X, OR gate 128, and AND gate 130 to AND gate 132 to let the pulse train continue to flow through the gate 132.

When the sine count equals 1000 (zero) and the cosine count equals 0001 (−7), the cosine count must start to count back up (still assuming that θ is still changing positively). This it does (even though the sine has a ONE sign bit) because a digital coincidence circuit 140 inhibits the "cosine-subtract" gate 136 but applies a signal through OR and AND gates 142 and 144 respectively, whereby the pulse train may pass through a gate 146 to make the cosine counter 112 count back up (i.e., from −7 to zero). As the cosine so counts upward, the sine goes negative, whereafter the gate 22 operates to keep the cosine counter counting upward.

When the sine count decreases to reach 0001 and the cosine count reaches 1000, the sine counter must change its direction of counting and start counting up. This it does (when θ changes positively) because the cosine at this time is positive.

Were the angle θ to be changed negatively, however, to cause the sine θ count to be 0001 and the cosine count to be 1000, the next pulse should cause the sine to count up, which it will in spite of a gate 16 output signal because of action of a coincidence circuit 150. In like manner, negative angle changes cause the cosine counter to count down when it reaches 1111 and the sine counter reaches 1000 (in spite of an output signal from the gate 24) because of action of a coincidence circuit 152.

Figure 6A:
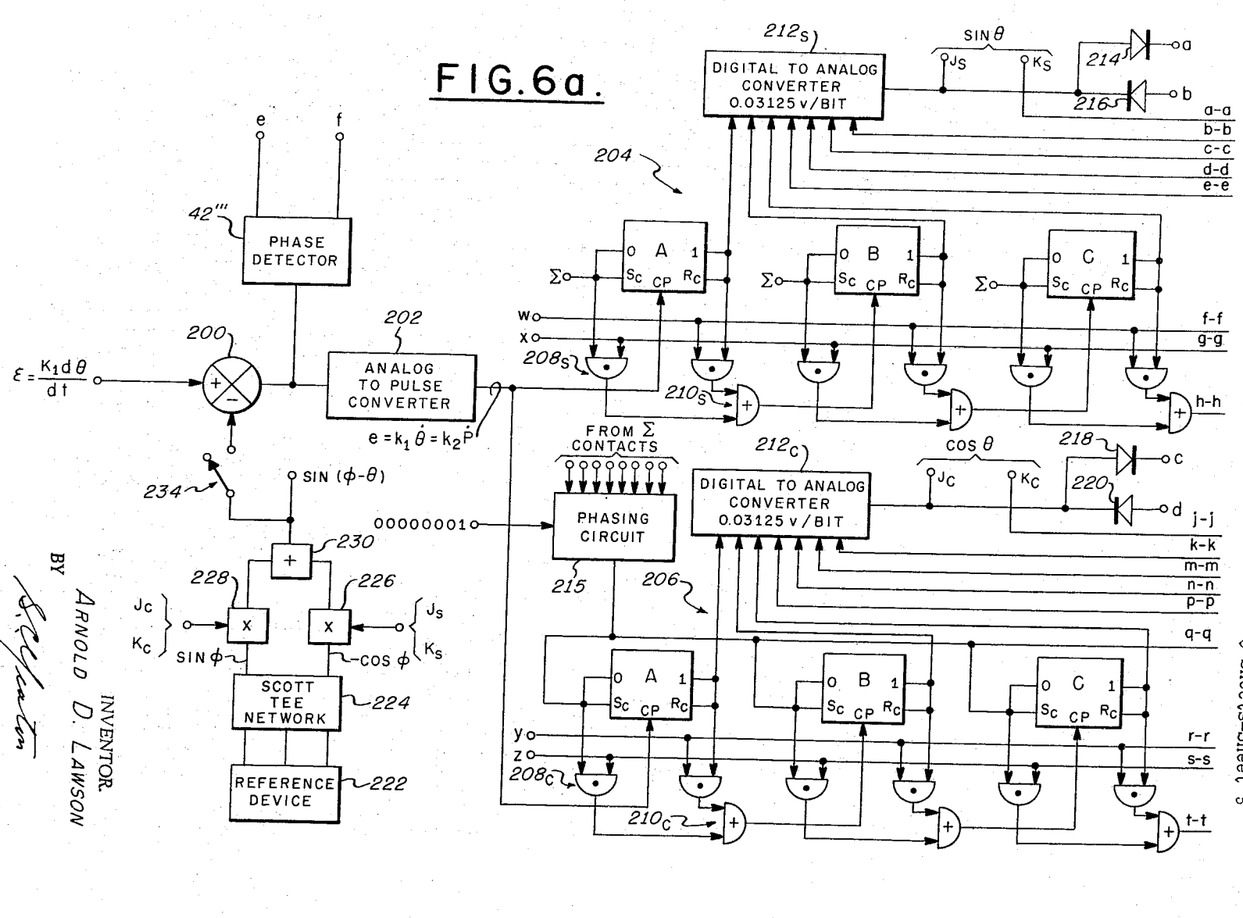
FIGS. 6a and 6b show a presently preferred form of the invention in a particular environment.
Figure 6B:
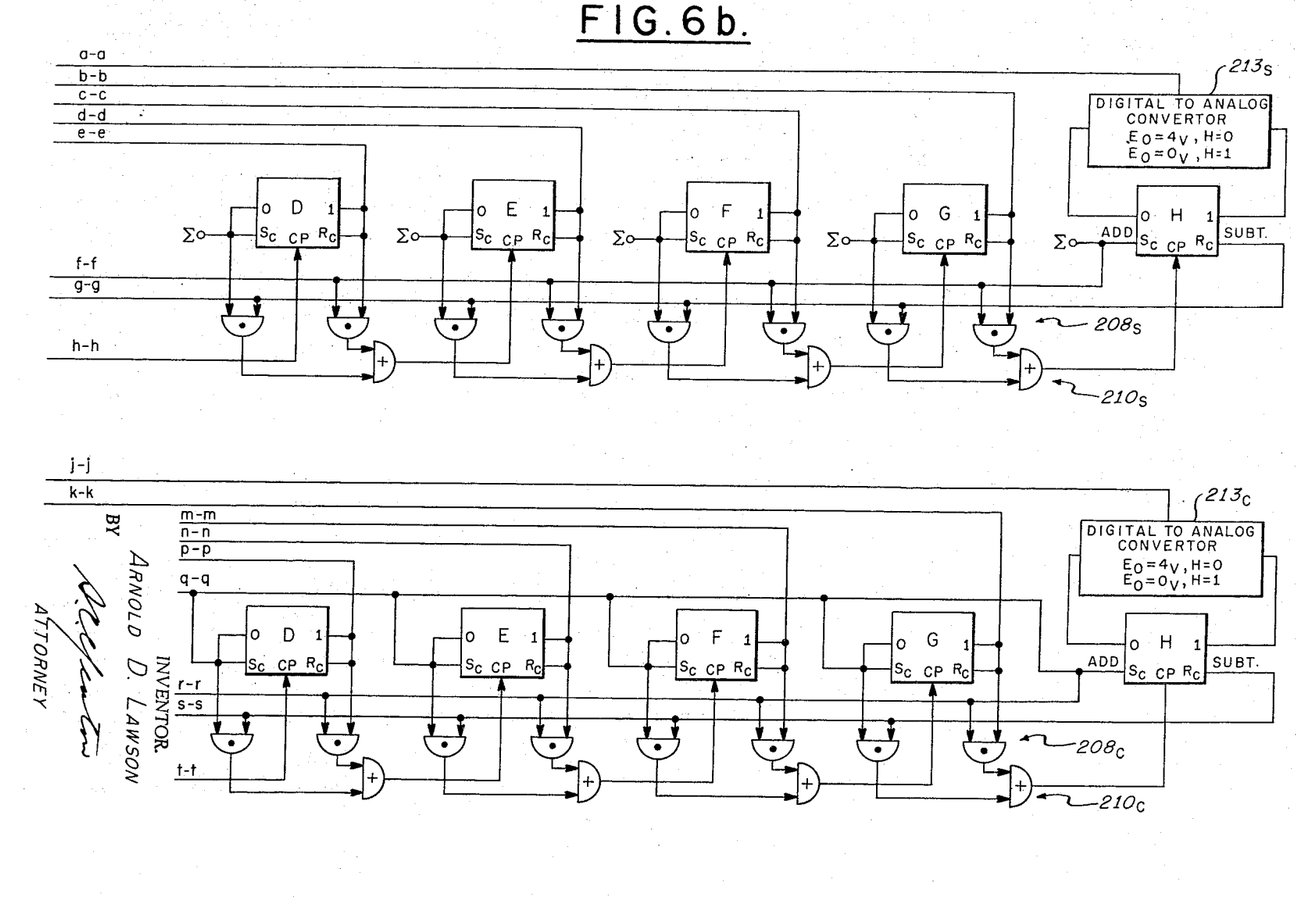

Referring to FIGS. 6a and 6b, a presently preferred embodiment of the invention is shown in a presently anticipated environment, i.e., in a signal smoothing integrator circuit synchronized to and useful in an autopilot having an attitude reference system. As such then, the circuit of FIGS. 6a and 6b provides from a signal $$\epsilon = \frac{d\theta}{dt}$$

an output signal sin (φ−θ), where φ represents a reference attitude, and may be used to replace the electromechanical circuit 45 of FIG. 1 of U.S. Patent 3,073,553, issued Jan. 15, 1963 in the name of Coleman et al. and assigned to the present assignee, such electromechanical circuit providing an output signal representing the sine of the difference between two angular shaft rotations. The control signal ε (which in the prior art electromechanical circuit gets integrated by a motor to produce a shaft rotation θ) is applied through a summing element 200 to an analog-to-pulse converter 202 like that described above with reference to FIG. 5a element 100. The output pulses from the converter 202 are applied to a pair of reversible counters 204 and 206 (for sine and cosine respectively) each of which comprises a plurality of flip-flop stages A through H (each stage being for example like the circuit of FIGS. 4–16 of Digital Computer Components and Circuits, R. K. Richards, D. Van Nostrand Company, Library of Congress, catalog card No. 57-13454) and respective cooperating AND OR gates 208 and 210. Each stage A through G of each counter has its "ONE" side connected to a digital-to-analog converter 212 which provides .03125 volt per bit stored in the counters 204 and 206. Therefore, for eight stage counters contacts $J_S$ and $J_C$ are excited from zero volts to 127×.03125=3.96875 volts, depending on the counts in those counters. For θ=0, the sine counter is set so that all stages A through G are in ZERO states and stage H is in its ONE state, and the cosine counter is set so that all of its stages A through H are in ONE states. A digital-to-analog converter 213 for each counter 204 and 206 applies four or zero volts to contacts $K_S$ and $K_C$ depending respectively on whether the stages H are in ZERO or ONE states. The converters 213 may for example comprise a pair of solenoid operated switches for selectively grounding or exciting the contacts $K_S$ and $K_C$. A phasing circuit for sensing when the sine counter goes through zero operates in response thereto to set the cosine counter 206 to a maximum count, thereby slaving the cosine count to the sine count. The phasing circuit 215 may take the form of a digital coincidence circuit or the EXCLUSIVE OR circuit noted above. Diode pairs 214, 216 and 218, 220 sense respectively whether contacts $J_S$ and $J_C$ are positive or negative with respect to the contacts $K_S$ and $K_C$, whereby the logic circuit of FIG. 2 may be employed to order the counters to count properly up or down.

For synchronizing purposes, a reference device 222 which may for example be a stable platform as is used in aircraft, provides a three-wire reference analog signal $\phi$ to a Scott T network 224 of the type described in Standard Handbook For Electrical Engineers, A. E. Knowlton, McGraw-Hill Book Company, New York, pages 6–104. such latter circuit provides signals —cas $\phi$ and sin $\phi$, being needed because the sine and cosine data computers provide two-wire sine and cosine data signals and because sin $\phi$ cos $\theta$ — sin $\theta$ cos $\phi$ equals the desired synchronous signal sin $(\phi - \theta)$. That the synchronous signal represents the sine of the difference between the integral of the input signal and an angle representing the relative orientations of a reference with respect to a controllable element be appreciated by realizing that the servo computer 45 of U.S. Patent 3,073,553 too responds principally to the sine of the difference between the output signal from a reference (pick-off 43) and the angular rotation of a shaft (element 57), such sine signal being derived across a synchro rotor (element 49). Multipliers 226 and 228 and a summing element 230 are employed to operate on the output signals from the sine and cosine computers, and from the Scott T network 224 in accordance with the above equation. A switch 234 when closed causes the sine and cosine computers to become synchronized with the reference device 222, and means (not shown) may be provided for clamping the sine and cosine counts, e.g., by opening the output circuit of the converter 202.

Assume the stages of the sine and cosine counters are set properly for $\theta=0$, i.e. to 00000001 and 11111111 respectively, thereby for the moment ignoring the question of synchronization, and that $$\epsilon = \frac{d\theta}{dt}$$

(to cause $\theta$ to change positively) is applied to the summing element 200. At this moment $J_S$ with respect to $K_S$ is zero volts and $J_C$ with respect to $K_C$ is +3.96875 volts. Both the diodes 214 and 218 apply respective signals to the FIG. 2 circuits 10 and 18 whereby the Add line of the sine counter 204 is excited and whereby the subtract line of the cosine counter 206 is excited. As pulses are provided by the converter 202 in response to the signal $\epsilon$, the sine counter 204 counts up, i.e., the sine counter stage A goes from 0 to 1, then from 1 to 0 and in so doing sends a pulse to the sine counter stage B setting it from 0 to 1, etc.; as the sine counter 204 counts up the same pulses which are applied thereto cause the cosine counter to count down, i.e., the cosine counter stage A goes from 1 to 0, then from 0 to 1 and in so doing causes the cosine counter B stage to go from 1 to 0, etc.

Figure 7:
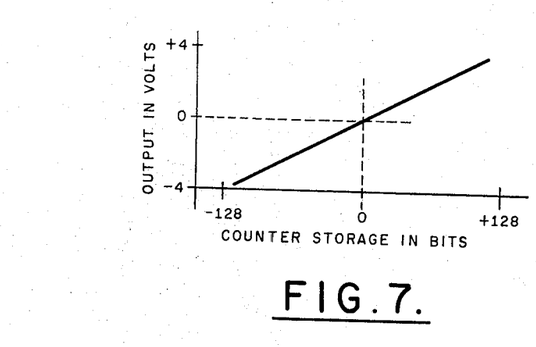
FIG. 7 is a diagram useful for understanding the apparatus of FIGS. 6a and 6b.

As the sine count goes up, the sine digital-to-analog converter 212s output approaches +3.96875 volts (see FIG. 7), at which time the sine counter stages A through G are full; simultaneous with this happening the cosine digital-to-analog converter 212c output voltage gradually goes to zero, i.e., its stages A through G are all at ZERO. The next pulse to the sine counter has no effect at this time on its stage H because such stage is simultaneously excited by ADD and input signals which cancel each other; since, however, the cosine counter is in a subtract mode, and at 00000001, this last received pulse switches the cosine stages A through G to ONE states and causes its stage H to switch in state from a ONE to a ZERO, whereby the contact $J_C$ goes negative with respect to the contact $K_C$, i.e., +4 volts is on contact $K_C$ and +3.96875 volts is on contact $J_C$.

With the cosine now negative, new pulses to the sine counter cause it to count down in the same manner as the cosine counter did, and since the sine is still positive the count in the cosine counter continues to decrease. At sin $\theta = 0$, i.e., the sine counter stages A through H are at 00000001, the next pulse (with $d\theta/dt$ being still positive) causes $J_S$ to go negative with respect to $K_S$, i.e., the sine counter stages A through G go to ONE states and the stage H goes to a ZERO state. However, such last-named pulse has no effect on the cosine counter (except to cause it thereafter to count down since the sine went negative) because of the cancelling effect of simultaneous application of ADD and input pulses.

On the question of synchronization, assume the signal $\phi$ from the reference is zero, but that initially the counters 204 and 206 are at some respective counts. Signals are therefore applied to the multipliers 226 and 228 to cause the summing element 230 to apply a signal to the converter 202. The converter will therefore apply pulses to the counters 204 and 208 to cause them to run up in count until $\phi - \theta = 0$ at which time the sine counter stages A through H will hold 00000001 and the cosine stages A through H will hold 11111111, and at which time synchronization will occur.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A resolver circuit comprising summing means connected to receive an analog control signal representing an angular change, converter means coupled to said summing means and responsive to a signal from said summing means for generating pulses having a repetition rate proportional to the magnitude of the signal from said summing means, means coupled to said converter means for counting said pulses, phasing means coupled to said counting means and responsive to the count instantaneously stored in said counting means for reversing the direction of counting when the angle represented by the stored count passes between quadrants, an output terminal, means responsive to said counting means for supplying to said output terminal a signal dependent upon the count instantaneously stored in said counting means, and switching means connected serially between said output terminal and said summing means for adding an output signal from said output terminal to said analog control signal.

2. In a data system, apparatus by which first and second signals are combined to provide an analog signal representative of the sine and their algebraic summation comprising means for producing pulses in a manner depending upon the magnitude of said first signal, counting means adapted to receive said pulses and for producing sine and cosine digital counts in response thereto, means adapted to receive said second signal for providing analog sine and cosine signal functions thereof, digital to analog converting means for converting said sine and cosine digital counts to respective analog signal representations thereof, means for multiplying the sine and cosine signal functions derived from said first signal respectively by the cosine and sine signal functions derived from said second signal to produce a pair of product signals, and means for algebraically summing said product signals to produce a sum signal, said sum signal being representative of the sine of the algebraic summation of said first and second signals.

3. In a data system, apparatus by which first and second signals may be combined to provide an analog signal representative of the sine of their algebraic summation comprising means for producing pulses at a rate proportional to the magnitude of a signal applied thereto, counting means adapted to receive said pulses for producing sine and cosine digital counts in response thereto, means adapted to receive said second signal for providing a first pair of analog sine and cosine signal functions in response thereto, digital to analog converting means for converting respectively said sine and cosine digital counts to a second pair of analog signal functions, means for multiplying the sine and cosine signal functions of one pair respectively by the cosine and sine signal functions of the other pair to produce a pair of product signals, means for algebraically summing said product signals to produce a sum signal, and selective means for applying or not said sum signal as feedback to cancel said first signal, whereby said sum signal is representative of the sine of the algebraic summation of said first and second signals when feedback occurs.

4. Apparatus for resolving a changeable signal into sine and cosine components of the time integral of such signal comprising first means for integrating a signal, second means for integrating a signal, third means for detecting the sign of the time integral signal of said first integrating means, fourth means for detecting the sign of the time integral signal of said second integrating means, fifth means for detecting the sign of changes to said changeable signal, and logic circuit means coupled to said third, fourth and fifth means for additively and subtractively applying said changeable signal to said first integrating means when the signs of the integral signal of said second integrating means and said changes to said changeable signal are respectively alike and different, and for subtractively and additively applying said changeable signal to said second integrating means when the signs of the integral signal of said first integrating means and said changes to said changeable signal are respectively alike and different.

5. Apparatus for resolving a changeable signal into sine and cosine components of the time integral of such signal comprising first means for integrating signals, second means for integrating signals, third means for detecting the sign of the time integral signal of said first integrating means, fourth means for detecting the sign of the integral signal of said second integrating means, fifth means for detecting the sign of changes to said changeable signal, means for increasing and decreasing the integral signal of said first integrating means in proportion to said changeable signal when the signs of the integral signal of said second integrating means and the changes to said changeable signal respectively are the same and opposite, and means for decreasing and increasing the integral signal of said second integrating means in proportion to said changeable signal when the signs of the integral signal of said first integrating means and said changes to said changeable signal respectively are the same and opposite.

6. Apparatus for providing signals representing the sine and cosine of the time integral of a time derivative input signal comprising first and second signal integration means, first gate circuit means for making said input signal additively combine with any signal held by said first integration means, second gate circuit means for making said input signal subtractively combine with any signal held by said first integration means, third gate circuit means for making said input signal subtractively combine with any signal held by said second integration means, and fourth gate circuit means for making said input signal additively combine with any signal held by said second integration means, means responsive when the signs of said input signal and the signal held by the second integration means are the same to apply a signal to said first gate circuit means, means responsive when the signs of said input signal and the signal held by said second integration means are different to apply a signal to said second gate circuit means, means responsive when the signs of said input signal and the signal held by said first integration means are the same to apply a signal to said third gate circuit means, and means responsive when the signs of said input signal and the signal held by said first integration means are different to apply a signal to said fourth gate circuit means.

7. Apparatus for resolving a changeable signal into sine and cosine components of the time integral of such signal comprising first means for integrating signals, second means for integrating signals, third means for detecting the sign of the time integral signal of said first integrating means, fourth means for detecting the sign of the integral signal of said second integrating means, fifth means for detecting the sign of changes to said changeable signal, logic circuit means coupled to said third, fourth and fifth means for additively and subtractively applying said changeable signal to said first integrating means when the signs of the integral signal of said second integrating means and said changes to said changeable signal are respectively alike and different, and for subtractively and additively applying said changeable signal to said second integrating means when the signs of the integral signal of said first integrating means and said changes to said changeable signal are respectively alike and different, attitude reference means, means for providing signals representing the cosine and sine of the angular displacement between an instantaneous attitude and a reference attitude, means for receiving and combining said last-named signals and the signals of said first and second integrating means to produce a resultant signal representing the sine of the difference between said angular displacement quantity and the angle whose sine and cosine signal integrals are provided respectively by said first and second integrating means, and means for decreasing said changeable signal in proportion to said resultant signal.

8. Apparatus for resolving a changeable signal into sine and cosine components of the time integral of such signal comprising first means for integrating signals, second means for integrating signals, third means for detecting the sign of the time integral signal of said first integrating means, fourth means for detecting the sign of the integral signal of said second integrating means, fifth means for detecting the sign of changes to said changeable signal, means for increasing and decreasing the integral signal of said first integrating means in proportion to said changeable signal when the signs of the integral signal of said second integrating means and the changes to said changeable signal respectively are the same and opposite, means for decreasing and increasing the integral signal of said second integrating means in proportion to said changeable signal when the signs of the integral signal of said first integrating means and the changes to said changeable signal respectively are the same and opposite, attitude reference means, means for providing signals representing the cosine and sine of the angular displacement between an instantaneous attitude and a reference attitude, means for receiving and combining said last-named signals and the signals of said first and second integrating means to produce a resultant signal representing the sine of the difference between said angular displacement quantity and the angle whose sine and cosine signal integrals are provided respectively by said first and second integrating means, and means for decreasing said changeable signal in proportion to said resultant signal.

9. Apparatus for providing signals representing the sine and cosine of the time integral of a time derivative input signal comprising first and second signal integration means, first gate circuit means for making said input signal additively combine with any signal held by said first integration means, second gate circuit means for making said input signal subtractively combine with any signal held by said first integration means, third gate circuit means for making said input signal subtractively combine with any signal held by said second integration means, and fourth gate circuit means for making said input signal additively combine with any signal held by said second integration means, means responsive when the signs of said input signal and the signal held by the second integration means are the same to apply a signal to said first gate circuit means, means responsive when the signs of said input signal and the signal held by said second integration means are different to apply a signal to said second gate circuit means, means responsive when the signs of said input signal and the signal held by said first integration means are the same to apply a signal to said third gate circuit means, means responsive when the signs of said input signal and the signal held by said first integration means are different to apply a signal to said fourth gate circuit means, attitude reference means, means for providing signals representing the cosine and sine of the angular displacement between an instantaneous attitude and a reference attitude, means for receiving and combining said last-named signals and the signals of said first and second integration means to produce a resultant signal representing the sine of the difference between said angular displacement quantity and the angle whose sine and cosine signal integrals are provided respectively by said first and second integration means, and means for decreasing said input signal in proportion to said resultant signal.

10. Apparatus for providing digital representations of the sine and cosine of an angle the time derivative of which is represented by an input signal, comprising means for producing a train of pulses the occurrence rate of which is proportional to the magnitude of said input signal, a reversible sine counter and a reversible cosine counter, first gate means for selectively making said sine counter count up, second gate means for selectively making said sine counter count down, third gate means for selectively making said cosine counter count down, fourth gate means for selectively making said cosine counter count up, said means for producing a pulse train applying said train to all of said gate means, means for producing a signal representing the sign of the count in said sine counter, means for producing a signal representing the sign of the count in said cosine counter, means for producing a signal representing the sign of said input signal, means for applying gate activating signals to said first and second gate means when the count of the cosine counter and the input signal have respectively the same and different signs, and means for applying gate activating signals to said third and fourth gate means when the count of the sine counter and the input signal have respectively the same and different signs.

11. Apparatus for providing digital representations of the sine and cosine of an angle the time derivative of which is represented by an input signal, comprising means for producing a train of pulses the occurrence rate of which is proportional to the magnitude of said input signal, a reversible sine counter and a reversible cosine counter, said counters employing their respective highest order stages to store bits representative of the signs of the counts in those counters, first gate means for selectively making said sine counter count up, second gate means for selectively making said sine counter count down, third gate means for selectively making said cosine counter count down, fourth gate means for selectively making said cosine counter count up, said means for producing a pulse train applying said train to all of said gate means, means for producing a signal representing the sign of the count in said sine counter, means for producing a signal representing the sign of the count in said cosine counter, means for producing a signal representing the sign of said input signal, means for applying gate activating signals to said first and second gate means when the count of the cosine counter and the input signal have respectively the same and different signs, and means for applying gate activating signals to said third and fourth gate means when the count of the sine counter and the input signal have respectively the same and different signs.

12. Apparatus for providing digital representations of the sine and cosine of an angle the time derivative of which is represented by an input signal, comprising means for producing a train of pulses the occurence rate of which is proportional to the magnitude of said input signal, a reversible sine counter and a reversible cosine counter, first gate means for selectively making said sine counter count up, second gate means for selectively making said sine counter count down, third gate means for selectively making said cosine counter count down, fourth gate means for selectively making said cosine counter count up, said means for producing a pulse train applying said train to all of said gate means, means for producing a signal representing the sign of the count in said sine counter, means for producing a signal representing the sign of the count in said cosine counter, means for producing a signal representing the sign of said input signal, means for applying gate activating signals to said first and second gate means when the count of the cosine counter and the input signal have respectively the same and different signs, means for applying gate activating signals to said third and fourth gate means when the count of the sine counter and the input signal have respectively the same and different signs, attitude reference means, means for producing signals representing the sine and cosine of the angular displacement between an instantaneous attitude and a reference attitude, means for receiving and combining said last-named signals with signals representing the counts of said sine and cosine counters to produce a resultant signal representing the sine of the difference between said angular displacement quantity and the angle whose sine and cosine counts are in said counters, and means for decreasing said input signal in proportion to said resultant signal.

13. Apparatus for providing digital representations of the sine and cosine of an angle the time derivative of which is represented by an input signal, comprising means for producing a train of pulses the occurrence rate of which is proportional to the magnitude of said input signal, a reversible sine counter and a reversible cosine counter, said counters employing their respective highest order stages to store bits representative of the signs of the counts in those counters, first gate means for selectively making said sine counter count up, second gate means for selectively making said sine counter count down, third gate means for selectively making said cosine counter count down, fourth gate means for selectively making said cosine counter count up, said means for producing a pulse train applying said train to all of said gate means, means for producing a signal representing the sign of the count in said sine counter, means for producing a signal representing the sign of the count in said cosine counter, means for producing a signal representing the sign of said input signal, means for applying gate activating signals to said first and second gate means when the count of the cosine counter and the input signal have respectively the same and different signs, means for applying gate activating signals to said third and fourth gate means when the count of the sine counter and the input signal have respectively the same and different signs, attitude reference means, means for producing signals representing the sine and cosine of the angular displacement between an instantaneous attitude and a reference attitude, means for receiving and combining said last-named signals with signals representing the counts of said sine and cosine counters to produce a resultant signal representing the sine of the difference between said angular displacement quantity and the angle whose sine and cosine counts are in said counters and means for decreasing said input signal in proportion to said resultant signal.

14. The apparatus of claim 11 wherein said counters are binary counters and wherein zero is represented by the median count that said counters hold when storing one bit less than needed to fill said counters, whereby negative and positive counts appear respectively as counts below and above the zero count.

15. The apparatus of claim 13 wherein said counters are binary counters and whereby zero is represented by the median count that said counters hold when storing one bit less than needed to fill said counters, whereby negative and positive counts appear respectively as counts below and above the zero count.

16. The apparatus of claim 10 including means responsive to a zero count in the sine counter for setting the stages of the cosine counter to store a count the absolute value of which is a maximum.

17. Apparatus for providing representations of the sine and cosine of a quantity represented by a pulse train having a pulse repetition rate proportional to the time derivative of said quantity comprising reversible sine and cosine counters having respective add and subtract busses for their respective stages, each of said stages having ZERO and ONE states and an input circuit for alternating between them in response to input signals, means for each stage for applying when it switches respectively from a ONE to a ZERO state and from a ZERO to a ONE state simultaneously with excitation of the add and subtract busses an input signal to the next higher order stage, means for preventing the highest order stage of each counter from switching from a ONE state to a ZERO state when it receives an input signal while said add bus is excited, means for preventing the highest order stage of each counter from switching from a ZERO to a ONE state when it receives an input signal while said subtract bus is excited, means for each of said counters for converting the counts in all but the highest order stages in said sine and cosine counters to respective analog voltages of N volts per bit stored in said counters and applying said voltages to respective first contacts for each counter, means for each of said counters for applying to respective second contacts thereof either zero volts or a voltage of N times the number of bits needed to fill all but the highest order stage of that counter depending respectively on whether said last stage is in a ONE or a ZERO state.

18. Apparatus for providing sine and cosine functions of the integral of a time derivative analog voltage comprising means for receiving said analog voltage to produce pulses having an occurrence rate proportional to said time derivative, reversible sine and cosine counters having respective add and subtract busses for their respective stages, each of said stages having ZERO and ONE states and an input circuit for alternating between them in response to input signals, means for each stage for applying when it switches respectively from a ONE to a ZERO state and from a ZERO to a ONE state simultaneously with excitation of the add and subtract busses an input signal to the next higher order stage, means for preventing the highest order stage of each counter from switching from a ONE state to a ZERO state when it receives an input signal while said add bus is excited, means for preventing the highest order stage of each counter from switching from a ZERO to a ONE state when it receives an input signal while said subtract bus is excited, means for each of said counters for converting the counts in all but the highest order stages in said sine and cosine counters to analog voltages of N volts per bit stored in said counters and applying said voltages to respective first contacts for each counter, means for each of said counters for applying to respective second contacts thereof either zero volts or a voltage of N times the number of bits needed to fill all but the highest order stage of that counter depending respectively on whether said last stage is in a ONE or a ZERO state, whereby the voltage across one pair of first and second contacts is representative of said sine function and whereby the voltage across the other pair of first and second contacts is representative of said cosine function.

19. Apparatus for providing sine and cosine functions of the integral of a time derivative analog voltage comprising means for receiving said analog voltage to produce pulses having an occurrence rate proportional to said time derivative, reversible sine and cosine counters having respective add and subtract busses for their respective stages, each of said stages having ZERO and ONE states, and an input circuit for alternating between them in response to input signals, means for each stage for applying when it switches respectively from a ONE to a ZERO state and from a ZERO to a ONE state simultaneously with excitation of the add and subtract busses an input signal to the next higher order stage, means for preventing the highest order stage of each counter from switching from a ONE state to a ZERO state when it receives an input signal while said add bus is excited, means for preventing the highest order stage of each counter from switching from a ZERO to a ONE state when it receives an input signal while said subtract bus is excited, means for each of said counters for converting the counts in all but the highest order stages in said sine and cosine counters to analog voltages of N volts per bit stored in said counters and applying said voltages to respective first contacts for each counter, means for each of said counters for applying to respective second contacts thereof either zero volts or a voltage of N times the number of bits needed to fill all but the highest order stage of that counter depending respectively on whether said last stage is in a ONE or a ZERO state, whereby the voltage across one pair of first and second contacts is representative of said sine function and whereby the voltage across the other pair of first and second contacts is representative of said cosine function, attitude reference means, means for providing signals representing the cosine and sine of the angular displacement between an instantaneous attitude and a reference attitude, means for receiving and combining said last-named signals and the signals appearing across said pairs of contacts to produce a resultant signal representing the sine of the difference between said angular displacement quantity and the angle whose sine and cosine functions are provided, and means for decreasing said analog signal in proportion to said resultant signal.

20. The apparatus of claim 18 including means responsive to the sign of the time derivative voltage and the sign of the signal appearing across the first and second contacts associated with the cosine counter for selectively exciting the add and subtract busses of the sine counter when respectively those signs are the same and opposite, and means responsive to the sign of the time derivative voltage and the sign of the signal appearing across the first and second contacts of the sine counter for selectively exciting the subtract and add busses of the cosine counter when respectively those signs are the same and opposite.

21. The apparatus of claim 20 including means responsive to the sign of the time derivative voltage and the sign of the signal appearing across the first and second contacts associated with the cosine counter for selectively exciting the add and subtract busses of the sine counter when respectively those signs are the same and opposite, and means responsive to the sign of the time derivative voltage and the sign of the signal appearing across the first and second contacts of the sine counter for selectively exciting the subtract and add busses of the cosine counter when respectively those signs are the same and opposite.

References Cited
UNITED STATES PATENTS 3,160,818  12/1964  Engle _______________ 328—66
3,262,109   7/1966  Swale _______________ 340—347

MAYNARD R. WILBUR, *Primary Examiner.*

DARYL W. COOK, *Examiner.*

J. H. WALLACE, G. R. EDWARDS,
*Assistant Examiners.*